Oct. 19, 1937.   G. L. PRATT   2,096,526
CHARGE-FORMING DEVICE FOR INTERNAL COMBUSTION ENGINES
Filed Oct. 26, 1933   2 Sheets-Sheet 1
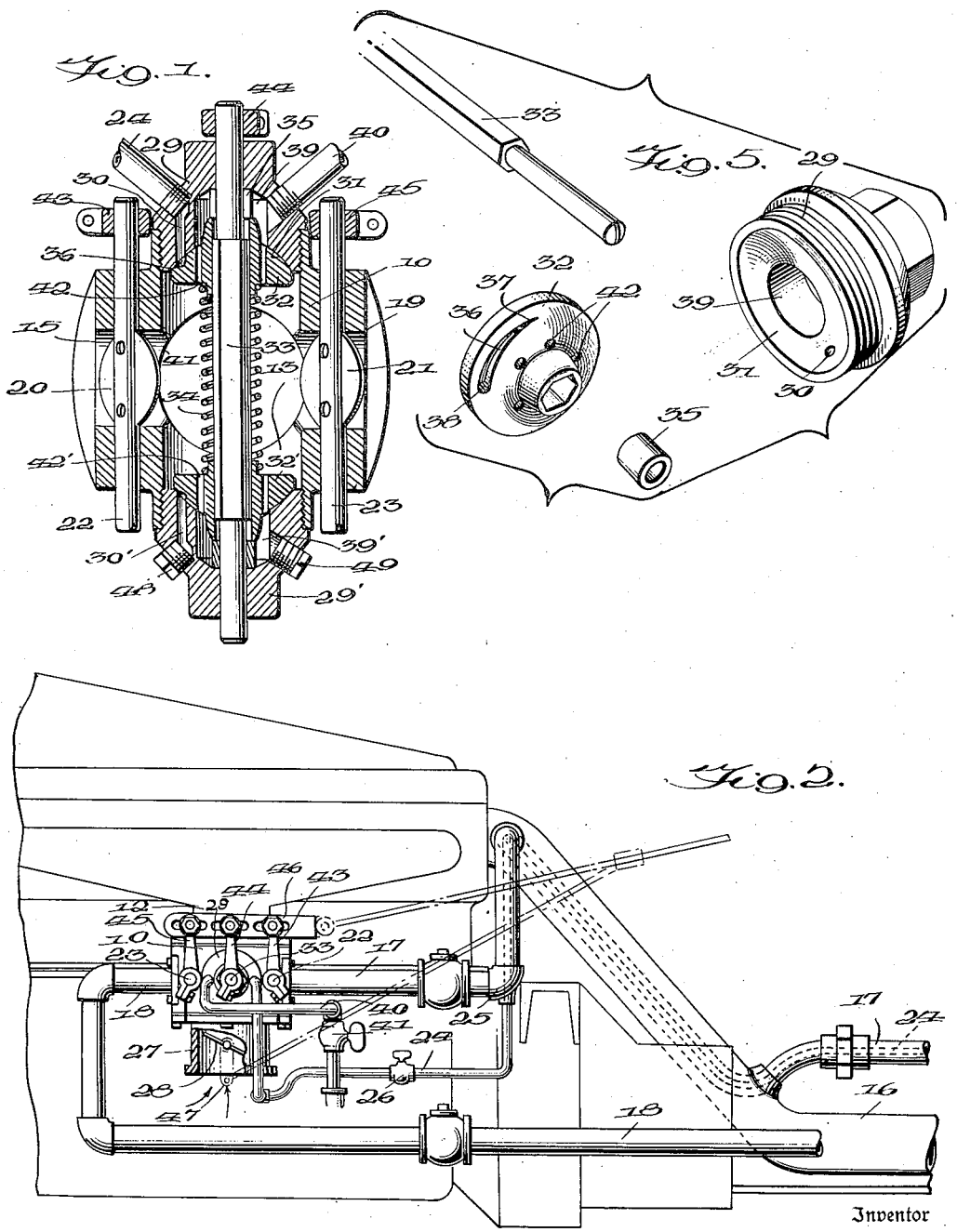
Inventor
George L. Pratt,
By
Edmund H. Parry Jr.
Attorney Oct. 19, 1937.   G. L. PRATT   2,096,526
CHARGE FORMING DEVICE FOR INTERNAL COMBUSTION ENGINES
Filed Oct. 26, 1933   2 Sheets-Sheet 2
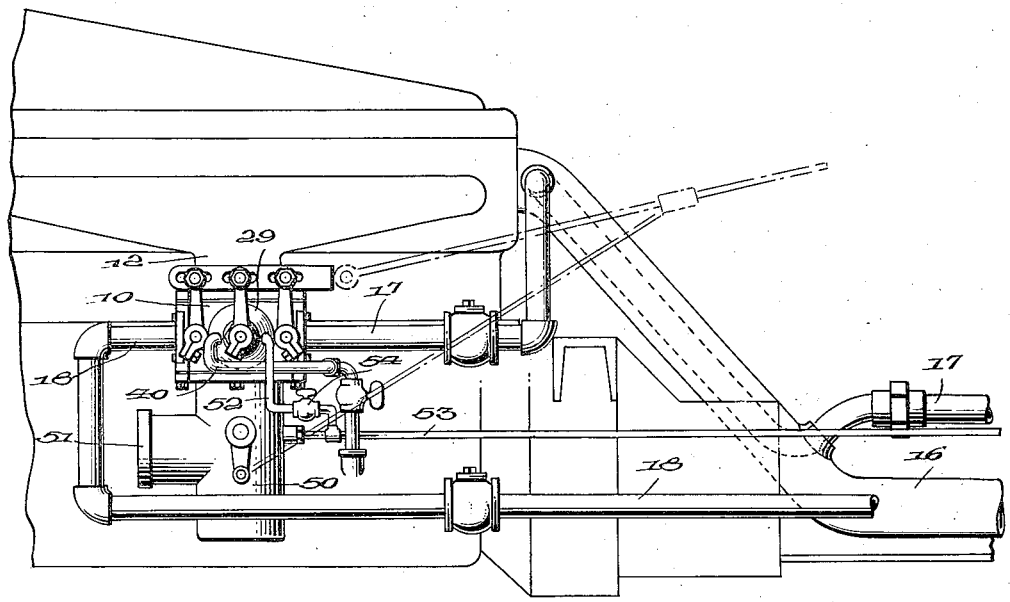
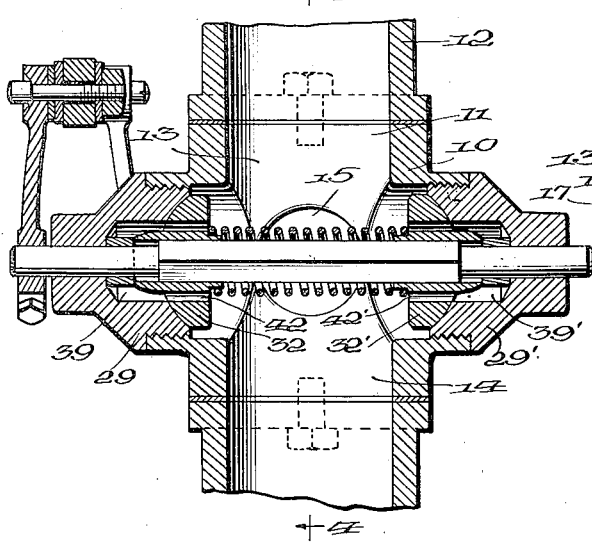
Inventor
George L. Pratt,
By
Edmund H. Pamp.
Attorney Patented Oct. 19, 1937

2,096,526

UNITED STATES PATENT OFFICE 2,096,526

CHARGE FORMING DEVICE FOR INTERNAL COMBUSTION ENGINES

George L. Pratt, Atlanta, Ga., assignor to Motor Power, Inc., Atlanta, Ga., a corporation of Georgia Application October 26, 1933, Serial No. 695,369

6 Claims. (Cl. 123—119)

In providing a combustible charge for internal combustion engines it is sometimes deemed desirable to supplement the usual fuel and air ingredients by the addition of other constituents including portions of the exhaust gases discharged from the engine. In the past the fuel and air have been usually integrated in a carburetor or other charge forming device and any additional constituents mixed with the resulting charge in the intake manifold of the engine without any provision for varying the quantity of the additional ingredients under different conditions of engine speed and without provision for maintaining definite proportions between the various ingredients for permitting any adjustment or change in proportions.

Essentially the present invention involves a device adapted to be associated with the intake of an engine in which the main constituents of the engine charge may be mixed with additional constituents, including exhaust gases prior to introduction into the engine. Control means are provided whereby the proportions of the various constituents which are to make up the final charge can be maintained constant or varied as the demand of the engine changes at different speeds. The device may be used in association with the usual carburetor, interposed between the same and the engine intake manifold, in which case the fuel and air may be integrated in the carburetor and the resulting mixture supplied in varying quantities to the device of the present invention to therein be admixed with definite proportions of exhaust gases and/or other ingredients. Again part of the fuel may be supplied directly to the present device for admixture with the other constituents and charge. If other provision is made for vaporizing the fuel, such as heating means, all of the fuel may be conducted directly to the device in varying controlled quantities and therein be admixed with definite proportions of air and other ingredients. In the latter installation the carburetor with its throttle valve will function solely as a variable air inlet for supplying the proper quantity of air to the device, or the carburetor may be eliminated and a valve-controlled air inlet formed as a part of the device.

Admission of the various ingredients into the device of the present invention will be controlled by suitable inlet valves which may be operated in synchronism to maintain definite proportions for the various ingredients as the rate of supply of the final mixture to the engine varies under changes in the engine speed. Arrangement is also made whereby the quantity of one or more of the ingredients may be independently regulated so that the proportion of each of the ingredients may be adjusted to provide the most satisfactory charge suitable to the needs of any engine and the characteristics of the particular fuel to be used.

The invention has application wherever the ordinary fuel and air mixture constituting a combustible charge for an engine is to be supplemented by other gaseous or liquid ingredients. It has, however, particular utility in connection with the internal combustion engine system of Charles J. Weeks as disclosed and described in his applications for patent, Serial Nos. 233,169 and 233,170, filed November 14th, 1927, and constitutes an improvement therein to the extent of providing an improved means for controlling the proportions of and admixing the various ingredients which make up the engine charge. According to such system selected portions of the exhaust gases are cycled back to the engine under pressure, reheated, and admixed with fuel and air to form the charge to be supplied to the engine. Provision may also be made according to such system for returning a second portion of exhaust gases without reheating, which portion is admixed in the intake manifold of the engine with the heated exhaust gas returned and the fuel and air ingredients. It is also contemplated according to such system that fumes from the engine crank case be integrated with the ingredients above mentioned as a part of the charge supplied to the engine.

In the practical use of the Weeks' system as described in the above identified applications some difficulty has been experienced in obtaining a proper charge for the engine by reason of the fact that the system made no provision for positively controlling the proportions of the heated and unheated exhaust gases or insuring a definite relationship in the proportions of the portions of the exhaust gases and other fuel charge ingredients under varying engine speed. Such difficulties are overcome by utilizing the present invention in connection with the Weeks system and I have been able to obtain improved fuel economy and more stable and satisfactory operation.

In order that my invention may be clearly understood I will describe one practical construction thereof and several practical uses as illustrated in the accompanying drawings wherein:

Fig. 1 is a view in transverse section of an illustrative device constructed in accordance with the invention;

Fig. 2 shows a side view of the device of Fig. 1 in association with an internal combustion engine system in which no carburetor is utilized;

Fig. 3 is a cross-sectional elevation of the device shown in Fig. 1;

Fig. 4 is a sectional elevation taken at right angles to the view of Fig. 3;

Fig. 5 is a detailed view of a valve structure forming a part of the inventive device with the various parts disassembled and shown in perspective; and, Fig. 6 is a view similar to Fig. 2 showing the application of the device to an internal combustion engine system in which a carburetor is cooperatively associated with the inventive structure.

As shown in detail in Figs. 1, 3 and 4 and in side view in Figs. 2 and 6 the inventive structure includes a casing or housing, preferably cast of metal, generally designated by the reference character 10. Such casing is adapted to be connected with the intake manifold of an internal combustion engine as shown in Figs. 2 and 6 and is provided, preferably at its top end, with an outlet port 11 of relatively large bore as shown in Figs. 3 and 4. A flange, as conventionally, will be provided at the end of the inlet manifold 12 to which the device may be bolted or otherwise secured.

The interior of the casing will form a chamber 13 in which the various ingredients entering into the fuel charge to be supplied to the intake manifold through the outlet port 11 will be admixed.

The casing is bored to provide a plurality of independent intake ports through which fuel from a source of fuel supply, air and other ingredients which are to form a part of the final charge for the engine may be introduced for admixture in the chamber 13. Since, as above explained, the invention has particular utility in connection with the Weeks system the construction and particular function of the various inlet ports will be described as applied thereto, although it will be understood that the invention is applicable wherever it is desired to admix other ingredients with the air and fuel to provide a compound charge for an internal combustion engine. In any event arrangement is made for controlling the passage of ingredients through the various inlet ports, or at least several of them, so that the ratio of the various ingredients entering into the engine charge may be maintained in a definite ratio as the supply of the resulting charge to the engine is increased or decreased to satisfy various conditions of engine speed and load.

As applied to the Weeks system as disclosed in the several applications for patent above identified the casing 10 will be bored to provide inlet means to the mixing chamber for fuel and air and additional independent inlet ports for exhaust gases, and preferably also for supplying to the mixing chamber oil fumes from the engine crankcase. As before mentioned, the Weeks system in its preferred embodiment contemplates cycling back to the engine intake two different portions of the exhaust gases, one of which is reheated during transit while under pressure, and accordingly it is desirable in the present device to provide separate inlet ports to the mixing chamber for such several portions. In the embodiment of the device illustrated in the drawings, reference being had particularly to Figs. 1, 3 and 4, an inlet port 14 is provided on the under side of the casing 10, such port serving as the air inlet to the mixing chamber, and in some instances as will hereafter be more fully explained, serving further to admit the fuel, or a portion of the fuel, which is the most essential ingredient of the engine charge. To admit exhaust gases to the mixing chamber a further inlet port 15 is provided in the casing, preferably as shown at one end thereof. As shown in the figures such inlet is of relatively large diameter inasmuch as the exhaust return is in the nature of a gas, and it is contemplated according to the Weeks system that an appreciable portion of the exhaust gases enter into the engine charge. Where only one portion of exhaust gases is to be utilized no additional exhaust gas inlet to the mixing chamber need be provided. On the other hand, according to the Weeks system, and as shown in both Figs. 2 and 6, one portion of the exhaust gases is withdrawn from the engine exhaust line 16 and returned through a pipe line 17, and such line is subject to an intense heat to treat the portion of the exhaust gases during transit back to the engine, the latter being accomplished by running the return line 17 through the main exhaust line 16 in the portion thereof in proximity to the engine wherein the exhaust gases which have just left the engine are in highly heated and flaming condition. Such heat treatment, which will be more fully understood by reference to the Weeks applications Serial Nos. 233,169 and 233,170, apparently affects a change in the composition of the exhaust gases which renders the same more useful as an ingredient of the engine charge. The exhaust gas return line 17 connects with the inlet port 15 of the casing 10 so as to introduce the treated gases into the mixing chamber 13.

A second portion of exhaust gases from the exhaust line 16 is returned under pressure through a second return line 18, and to admit such gases to the mixing chamber a second exhaust inlet port 19 similar to port 15 is provided in the casing with which connects the end of return line 18. At a matter of convenience port 19 may be positioned at the opposite end of the casing from the inlet 15.

In order that the portions of exhaust gases entering into the charge may be definitely proportioned valves 20 and 21 are provided to control the respective heated and unheated exhaust inlets 15 and 19. Such valves preferably are of the butterfly type as shown in Figs. 1 and 4, being mounted on and controlled respectively on rotatable shafts 22 and 23. Arrangement is made as will hereafter be explained for operating the valves 20 and 21 simultaneously so that the proportions of the several portions of exhaust gases may be maintained in a definite ratio under all conditions of engine speed and load.

It will be evident from a consideration of the application of the invention shown in Fig. 2 that the same may be used in the absence of a carburetor or other similarly constructed charge-forming device for atomizing the fuel and mixing the same with air. In this instance, the fuel from a source of fuel supply is conducted through a fuel line 24 directly to the device of the invention. Provision is made to vaporize the fuel during transit, as in the case of the Weeks system disclosed in his applications, by passing the fuel line 24 for a portion of its length in contact with the hot exhaust gases, preferably, and as shown in Fig. 2 the same extending interiorally through the hot exhaust gas return line 17, which as above explained is subject to the flaming exhaust gases in the vicinity of the engine. The fuel line passes out of the exhaust gas return line 17 at the coupling 25 and the fuel, previously liquid, will now be either in wholly or substantially completely vaporized condition. If any portion of the fuel is not vaporized this condition will be remedied in the mixing chamber 13 where the fuel is mixed with the heated exhaust gas return supplied through the return line 17. If desired, a cut-off valve 26 may be provided in the fuel line 24 to either cut off or regulate the quantity of fuel passing to the mixing chamber, but in addition thereto I provide an independent valve of novel construction as a part of my device so that the quantity of fuel may be properly proportioned with respect to the other ingredients making up the fuel charge.

In the application of my invention in the system of Fig. 2, now under consideration, the inlet port 14 to the mixing chamber on the lower side of the casing will function solely as an air intake. To this end an inlet conduit 27 is associated with the inlet port in which is disposed a butterfly valve 28 for controlling the quantity of air admitted to the mixing chamber under varying conditions of engine speed and load.

To control the admission of fuel from the fuel line 24 to the mixing chamber 13 arrangement is made whereby the quantity of fuel admitted under varying conditions of engine speed and load is carefully regulated. To this end a special valve construction is provided in association with the casing which is best shown in Figs. 1 and 3 and in the detailed view of Fig. 5. As a matter of convenience the fuel inlet valve will be positioned on one side of the casing. As a matter of convenience in manufacture and to facilitate cleaning the valve construction will be formed independently of the casing and removably mounted therein. Such construction will include a plug 29 screw threaded or otherwise secured in the side of the casing. Extending through the plug between its center and periphery is a fuel inlet passage 30 with the outer end of which the fuel supply line 24 communicates. The inner face 31 of the plug is machined to a semi-spherical contour as shown in Figs. 1 and 5, and seating against such curved face is a rotary valve body 32 carefully machined to make sealing contact therewith. A shaft 33 is provided to support and effect rotation of the valve body. In order that the body may at all times bear against its seat the same should not be rigidly fixed on the shaft. To this end the body is made slidable on the shaft and caused to turn with the shaft by providing the latter with one or more flattened surfaces engageable with corresponding surfaces in the bore of the valve body. In the drawings the shaft is made hexagonal for a portion of its length, but obviously the same may be of any other shape which will enable the valve body to be slidably splined thereon. Such shaft extends transversely through the casing between the shafts 22 and 23 of the two exhaust inlet valves. Such shaft is rotatable through actuating means hereafter to be described to rotate the valve body 32 with respect to the plug facing 31 and the fuel inlet passage 30 which extends through the plug to such face. To maintain a tight sliding contact between the valve body 32 and plug facing 31 an expansible spring 34 is mounted on the shaft 33 bearing against the inner end of the valve body 32 and yieldingly maintaining the valve body against the face 31. A bushing 35 may be positioned against the outer end of the body 32 and the end wall of the plug 29.

To admit fuel to the mixing chamber entering through the passage 30 in the plug 29, in varying quantities, the outer face of the rotary valve body 32 is provided with a recess 36 which extends along the arc of a circle having a distance from the axis of the rotary valve body such that the recess when the valve body is rotated will lie opposite and be in communication with the inner end of the fuel inlet passage 30 at the face 31 of the plug 29.

The groove or recess 36 at one end 37 commences as a point and gradually increases both in width and in depth over an arc of about 90 degrees and finally terminates at its other end in a passage 38 extending completely through the valve body to provide communication with the mixing chamber as best shown in Fig. 4.

With the arrangement just described the fuel supply to the mixing chamber from the fuel pipe 24 will be substantially cut off when the end 37 of the recess in the rotary valve body lies opposite the inlet passage 30. As the shaft 33 is rotated, however, a passage of increasing proportions is gradually presented to the fuel passage 30 to permit the passage of an increasing quantity of fuel through the port 38 in the valve body into the mixing chamber. When the shaft has been rotated sufficiently to bring the larger end of the groove 36 opposite the inlet passage 30, full open position is attained as at such time the passage 38 in the valve body will be in alignment with the fuel passage 30. It will be understood that the rotation of the valve body to admit varying quantities of fuel from the fuel line into the mixing chamber is regulated through a control system in a manner analogous to the butterfly valve in the conventional carburetor in accordance with varying conditions of engine speed and load.

The air in the crankcase of internal combustion engines contains an appreciable quantity of matter which has fuel and lubricating values, being impregnated with vaporized or atomized fuel which has escaped from the cylinders past the rings on the pistons and with oil spray or mist caused by heat and agitation in the crankcase. Such materials, which I will hereafter for convenience refer to generally as "crankcase fumes", may desirably be employed as a part of the fuel charge. To provide for the admission of the fumes from the crankcase of the engine, an inlet may be provided at any suitable point in the casing 10. I have found that as a matter of convenience an inlet may be provided in association with the plug 29 which forms a part of the fuel inlet valve just described. To this end the central interior portion of the plug interiorly of the semi-spherical face 31 is cut out to provide a chamber 39 as shown in Figs. 1, 3 and 5 to which the crankcase fumes are conducted through a pipe 40 leading at its other end into the crankcase of the engine as shown in Fig. 2. By this arrangement the oil constituents of the fumes serve to lubricate the movable parts of my mixing device and better seal the seats of the valves therein. It appears unnecessary that the quantity of the crankcase fumes entering into the fuel charge in the mixing chamber 13 be definitely proportioned with respect to the other ingredients, the maximum quantity of crankcase fumes obtainable apparently being desirable. I therefore make no provision for regulating the quantity of the fumes entering the mixing chamber, although a cut-off valve 41 may, if desired, be inserted in the oil fume line 40. To conduct the fumes entering the chamber 39 in the plug 29 to the mixing chamber a series of passages 42 are provided through the rotary valve body 32. It will be understood that with this arrangement the quantity of crankcase fumes entering the mixing chamber through the passages 42 will to no extent be varied as the valve body 32 rotates to change the quantity of fuel entering the chamber through the recess 36 and fuel passage 38.

I have now explained that the quantity of fuel, air and treated and untreated portions of exhaust gases is regulated by suitable control valves. In order that the proportions of these various ingredients may be maintained the same under various conditions of engine speed and load the various valves should be operated in synchronism. Referring particularly to Fig. 2 and in connection therewith to Fig. 1, it will be noted that I have provided a valve actuating arrangement carrying out such purpose. Fixed to the shaft 22 which controls the valve 21 regulating the quantity of heated exhaust gas entering the mixing chamber, is a lever 43. A similar lever 44 is secured to the shaft 33 controlling the fuel inlet rotary valve 32, and a third lever 45 is secured to shaft 23 of the second exhaust inlet valve 21. A bar 46 extends along the upper ends of the three levers 43, 44 and 45, and slotted apertures are provided therein through which pivot bolts may be inserted to connect the various levers to the bar 46. By this arrangement as the bar is moved in one direction the several exhaust valves and the fuel valve will be simultaneously opened to the same degree and closed when the bar is moved in the opposite direction.

It may be desirable in different engines to utilize different proportions of the various ingredients, and some adjustment may have to be made, depending upon the characteristics of the particular fuel selected. It is therefore important that the individual valves may be independently adjusted one with respect to the other. Some adjustment may be made by reason of the slotted connections between the ends of the levers 43, 44 and 45 and the bar 46, but for more radical adjustment the inner ends of the levers may, as shown in Fig. 2, be provided with split bushings which may be rotatably adjusted with respect to the various valve shafts.

The air inlet valve 28 to the mixing chamber positioned in the inlet conduit 27 should also be operated in synchronism with the other control valves. The same may be provided with a lever 47 and any desired actuating linkage provided (such as indicated in phantom lines in Fig. 2) whereby movement of the valve levers 43, 44 and 45 through the bar 46 will be accompanied by a corresponding movement of the lever 47 of the air inlet valve.

With the arrangement described it will be understood that the quantities of all of the ingredients entering into the charge to be supplied to the engine through the inlet manifold 12, with the exception of the fumes from the crankcase, are definitely proportioned each with respect to the other, and the ratio between the various ingredients maintained constant under the synchronized action of the various control valves. As the engine demands an increased quantity of charge, the valves for the various ingredients will all be opened further to allow increased quantities of all of the ingredients to enter the chamber 13 for admixture therein, and the reverse is true where the demand of the engine diminishes.

In the particular embodiment of my device shown in Figs. 1, 3 and 4, provision is made for the introduction of fuel and also the fumes from the crankcase at two points. Thus it will be observed that the structure on one side of the casing 10 through which the fuel and fumes are admitted from the fuel supply line 24 and the fume line 40 finds a counterpart on the opposite side of the casing. The various parts are duplicated, there being a plug 29', a rotary valve body 32' complementary to the valve body 32, a crankcase fume receiving chamber 39' and a fuel inlet passage 30' in the plug 29'. The valve body 32' will be constructed similar to the valve body 32 as shown in Fig. 5, and will be splined to the shaft 33 so as to be operable simultaneously with the first fuel valve. Passages 42' are provided therein for the admission of crankcase fumes from the chamber 39'. In the embodiment illustrated in Fig. 1 the second fuel and crankcase fume inlets are sealed by the respective plugs 48 and 49. Thus it is possible to use the embodiment of the device illustrated with only single fuel and fume inlets as in Fig. 2, and in fact it is not necessary to provide the dual construction as just described. In some cases, however, it may appear advisable to use the second fuel and crankcase fume inlets, as where it is found that the inlets through the plug 29 and the valve associated therewith do not provide sufficient quantities of these ingredients. In such case the plugs 48 and 49 are removed and connections provided between the two openings in the plug 29' and the fume and oil inlet pipes 24 and 40.

In the application of the device in Fig. 2 it will be recalled that no carburetor was used in connection with my mixing device. The device can, however, be used in association with the carburetor as illustrated in Fig. 6 wherein the casing 10 of the device is interposed between the engine intake manifold 12 and a conventional type carburetor 50 having an air inlet 51. The device may be constructed as previously described. If it is desired to use the carburetor solely as an air intake for the device fuel will be conducted into the fuel valve associated with the plug 29 through an inlet pipe 52. In this case it is desirable that the fuel be preliminarily vaporized by passing the fuel through the exhaust line or some other heater such as shown and described in connection with Fig. 2. On the other hand, where the carburetor is functioning in its normal manner to vaporize the fuel and mix the same with air before admission of these ingredients into my device, the fuel need not be preliminarily vaporized but may be conducted to the carburetor 50 in liquid form through a fuel line 53 which connects with the source of fuel supply. In this event the fuel inlet line 52 to the mixing device is unnecessary and may be cut off by a valve 54. Even when using a carburetor, it may, however, be deemed desirable to admit a portion of the fuel directly to the mixing chamber, this being done merely by opening the valve 54 to any desired degree.

As previously stated, it is the essential purpose of the invention to provide a device through which fuel and air may be incorporated in the fuel charge for an engine. It may be deemed desirable to introduce only one portion of exhaust gases, in which event one of the exhaust gas inlets 15 and 19 may be plugged up or the device may be constructed with only one of such inlets and its accompanying control passages 15 and 19 may be used to introduce other ingredients than the exhaust gases. If it is preferred not to incorporate fumes into the fuel charge the fume pipe 40 and the connecting passages in the inventive device may be either eliminated or used for some other purpose. In short, the particular function assigned to the various inlets in the mixing chamber is merely illustrative for the purpose of making clear the utility of the inventive structure.

Regardless of what particular ingredients are combined into a fuel charge, it will be evident that I have provided a device in which due to the synchronized action of the various control valves the various ingredients may be definitely proportioned with respect to each other under all conditions and regardless of variations in volume of the final charge required by the engine.

By providing for the individual adjustment of one or more of the several inlet control valves the quantity of one or more of the ingredients with respect to the other ingredients may be changed to provide a mixture best suited for combustion in the engine. Also it may be found that a greater or lesser quantity of a particular ingredient should be used when the engine is running at low and idling speeds than when the engine is running at high speed or under heavy load. It will be evident in the latter connection that with the control arrangement previously described the various valves even though arranged to operate simultaneously may be independently set so that some are in advance of the others. When one or more of the valves are partially open the others may be set in closed position, thereby making it possible to form a mixture including only some of the ingredients when the engine is at idling speed.

I claim:

1. In a charge mixing device for internal combustion engines, a casing, a mixing chamber in the casing, an outlet in the casing for the charge formed in said chamber, an inlet in the casing for admitting fuel to the chamber, a valve body movable with respect to and controlling the fuel inlet and having a port through which fuel from the inlet is supplied to the mixing chamber, a passageway of gradually increasing cross section providing communication between the fuel inlet and the port in the valve body and adapted to permit the introduction into the mixing chamber of an increasing quantity of fuel as the valve body is moved relative to the fuel inlet, means for moving said valve body, and additional inlet means in the casing for admitting other charge ingredients to the chamber for admixture with the fuel.

2. In a charge mixing device for internal combustion engines, a casing, a mixing chamber in the casing, an outlet in the casing for the charge formed in said chamber, an inlet in the casing for admitting fuel to the chamber, a rotatable valve body controlling the admission of fuel through said inlet, a port in said body adapted to be brought in registry with the inlet, an arcuate groove in the face of the valve body communicating with said port and positioned to provide communication between the port and the fuel inlet as the valve body is rotated, said groove gradually decreasing in cross-section from the port so that as the valve body is rotated a variable quantity of fuel will be admitted therethrough to the mixing chamber from the fuel inlet, and additional inlet means for admitting other charge ingredients to the chamber for admixture with the fuel, one of said additional inlets including an inlet port in the casing lying opposite the valve body, and a passage in the valve body additional to the fuel port providing constant communication between said casing inlet port and the mixing chamber as the valve body is rotated.

3. In a charge mixing device for internal combustion engines, a casing, a mixing chamber in the casing, an outlet in the casing for the charge formed in said chamber, an inlet in the casing for admitting fuel to the chamber, a rotatable valve body controlling the admission of fuel through said inlet, a port in said body adapted to be brought in registry with the inlet, an arcuate groove in the face of the valve body communicating with said port and positioned to provide communication between the port and the fuel inlet as the valve body is rotated, said groove gradually decreasing in cross-section from the port so that as the valve body is rotated a variable quantity of fuel will be admitted therethrough to the mixing chamber from the fuel inlet, additional inlets to the mixing chamber for supplying air and engine exhaust gases thereto for admixture with the fuel, valves controlling said air and exhaust gas inlets, and actuating means for simultaneously operating the fuel, air and exhaust gas inlet control valves.

4. A charge mixing device for internal combustion engines comprising a casing having therein a central mixing chamber, a large inlet port having a control valve therein and communicating directly with said chamber for supplying a variable quantity of engine exhaust gases thereto, further valved inlet means in the casing also communicating directly with the mixing chamber for supplying variable quantities of fresh fuel and air to said chamber for admixture therein with the exhaust gases, synchronized means for operating the various control valves adapted to maintain desired proportions of the various ingredients entering the mixed charge under varying demands of an engine, and an outlet from the mixing chamber for supplying the mixed charge to an engine intake manifold.

5. In a charge forming system for internal combustion engines a charge mixing device including a casing housing a mixing chamber, means for supplying air and fresh fuel to said casing, means for supplying an additional fuel component comprising portions of engine exhaust gases to the casing, an exhaust gas inlet port connecting with the exhaust gas supply having a control valve therein and communicating directly with said mixing chamber for supplying a variable quantity of exhaust gases to be mixed in the chamber with the fresh fuel and air, further valved inlet means connecting with the air and fresh fuel supply means and also directly communicating with the mixing chamber for supplying variable quantities of air and fuel to said chamber for admixture therein with the exhaust gases, and common actuating means for simultaneously operating the separate valve means to supply an increasing quantity of exhaust gases to the chamber under control of one of said valve means as the quantity of air and fresh fuel supplied is separately increased under control of other of the valve means.

6. In an internal combustion engine including intake and exhaust manifold, a charge forming device comprising a mixing chamber directly connected to said intake manifold, valved air and fuel conduits opening into said chamber, two valved exhaust conduits leading from said exhaust manifold and discharging into said chamber, heating means for one of said exhaust conduits, and control means for simultaneously actuating all of said valves.

GEORGE L. PRATT.